(12) United States Patent
Park

(10) Patent No.: US 11,653,666 B2
(45) Date of Patent: May 23, 2023

(54) CAFFEINE REDUCTION APPARATUS AND METHOD OF MANUFACTURING COFFEE GROUNDS POWDER USING SAME

(71) Applicant: Harmony Social Cooperative Association, Daejeon (KR)

(72) Inventor: Hea Young Park, Daejeon (KR)

(73) Assignee: Harmony Social Cooperative Association, Daejeon (KR)

( * ) Notice: Subject to any disclaimer, the term of this patent is extended or adjusted under 35 U.S.C. 154(b) by 0 days.

(21) Appl. No.: 17/718,940

(22) Filed: Apr. 12, 2022

(65) Prior Publication Data

US 2022/0338499 A1 Oct. 27, 2022

(30) Foreign Application Priority Data

Apr. 21, 2021 (KR) .......................... 10-2021-0051479

(51) Int. Cl.
*A23F 5/20* (2006.01)
*B01F 23/53* (2022.01)
(Continued)

(52) U.S. Cl.
CPC .............. *A23F 5/20* (2013.01); *B01F 23/53* (2022.01); *B01F 27/112* (2022.01); *B01F 27/191* (2022.01); *B01F 27/70* (2022.01); *B01F 35/2115* (2022.01); *B01F 35/2132* (2022.01); *B01F 35/2212* (2022.01); *B01F 35/2215* (2022.01); *B01F 35/91* (2022.01);
(Continued)

(58) Field of Classification Search
CPC .......... B09B 3/00; B01F 35/2132; A23F 5/20
See application file for complete search history.

(56) References Cited

U.S. PATENT DOCUMENTS

| 5,185,126 A | * | 2/1993 | Adamski | ................... A61L 2/04 |
| | | | | 422/38 |
| 7,845,586 B2 | * | 12/2010 | Lee | ......................... B02C 23/00 |
| | | | | 241/101.8 |
| 2020/0147617 A1 | * | 5/2020 | Atkinson | ................ B02C 18/24 |

FOREIGN PATENT DOCUMENTS

| KR | 10-2005-0024478 A | 3/2005 |
| KR | 10-1298557 B1 | 8/2013 |
| (Continued) | | |

OTHER PUBLICATIONS

Korean Office Action for related KR Application No. 10-2021-0051479 dated Aug. 18, 2021 from Korean Intellectual Property Office.

(Continued)

*Primary Examiner* — Elizabeth Insler
(74) *Attorney, Agent, or Firm* — Paratus Law Group, PLLC

(57) ABSTRACT

A caffeine reduction apparatus includes: a main housing provided with an inlet and outlet pipe; a mixing portion including an accommodating portion through which coffee grounds are input inside the accommodating portion, and a blade configured to be rotated inside the accommodating portion such that the coffee grounds are mixed; a driving portion configured to rotate the blade; and an ultraviolet ray emitting portion positioned at an upper portion of the main housing and mounted at an inner side surface of a door that seals an inner portion of the mixing portion, the ultraviolet ray emitting portion being configured to emit ultraviolet rays toward the mixing portion.

3 Claims, 3 Drawing Sheets

(51) Int. Cl.
*B01F 27/112* (2022.01)
*B01F 27/191* (2022.01)
*B01F 35/92* (2022.01)
*B01F 35/21* (2022.01)
*B01F 27/70* (2022.01)
*B01F 35/91* (2022.01)
*B01F 35/221* (2022.01)
*B01F 101/06* (2022.01)
*B01F 35/90* (2022.01)

(52) U.S. Cl.
CPC .......... *B01F 35/92* (2022.01); *B01F 2035/98* (2022.01); *B01F 2035/99* (2022.01); *B01F 2101/06* (2022.01)

(56) References Cited

FOREIGN PATENT DOCUMENTS

KR   10-2016-0074506 A   6/2016
KR   10-2016-0128749 A   11/2016

OTHER PUBLICATIONS

Korean Notice of Allowance for related KR Application No. 10-2021-0051479 dated Dec. 3, 2021 from Korean Intellectual Property Office.

Minjeong Shin et al., "Extraction of Caffeine from Spent Coffee Grounds and Oxidative Degradation of Caffeine", Journal of Environmental Science International, Dec. 2018, pp. 1205-1214.

* cited by examiner

CAFFEINE REDUCTION APPARATUS AND METHOD OF MANUFACTURING COFFEE GROUNDS POWDER USING SAME

CROSS-REFERENCE TO RELATED APPLICATION

The present application claims priority to Korean Patent Application No. 10-2021-0051479 (filed on Apr. 21, 2021), which is hereby incorporated by reference in its entirety.

BACKGROUND

The present disclosure relates to a caffeine reduction apparatus and a method of reducing caffeine of coffee grounds by using the caffeine reduction apparatus. More particularly, the present disclosure relates to a caffeine reduction apparatus for recycling coffee grounds by eluting and decomposing caffeine from the coffee grounds and then drying the coffee grounds, and relates to a method of manufacturing a coffee grounds powder using the caffeine reduction apparatus.

As the café industry have developed recently, the imported amount of whole beans and coffee beans that are for making coffee has been increased from 133,000 tons in 2014 to 167,654 tons in 2019. Accordingly, the generated amount of coffee grounds is also steadily increasing.

In 2018, the generated amount of coffee grounds in Korea was about 120,000 tons, and 7,500,000 tons of coffee grounds were generated in the whole world. The coffee grounds generated as described above are classified as household waste and cannot be recycled, and most of the coffee grounds are discarded by landfilling and incineration.

Recycling of coffee grounds is a matter that has been continuously researched conventionally. This is because the coffee aroma of the coffee grounds lasts for a long time, and the dark brown color of the coffee grounds is also sufficient to have an attractive impression. In addition, since there is a deodorizing effect through the strong coffee aroma, products such as ornaments and scented candles, and so on utilizing the coffee grounds have been developed. Even now, active research on products that are capable of creating a new value by recycling coffee grounds has been continuously conducted.

However, in the coffee grounds, caffeine remains, so that the recycling range of the coffee grounds is limited. To improve this, a fermentation method in which fallen leaves or sawdust is mixed or EM enzyme that is a microorganism helping fermentation has been used. However, this method has a disadvantage that the amount of the coffee grounds that are treated is very limited since an inconvenient process and a long fermentation time are required.

Therefore, a technology related to an apparatus capable of easily decomposing and removing caffeine included in coffee grounds and a method of recycling coffee ground using the apparatus is required to be developed.

DOCUMENT OF RELATED ART (Patent Document 1) Korean Patent Application Publication No. 10-2016-0128749 (Nov. 8, 2016)
(Patent Document 2) Korean Patent No. 10-1298557 (Aug. 14, 2013)

SUMMARY

Accordingly, the present disclosure has been made keeping in mind the above problems occurring in the related art, and an objective of the present disclosure is to provide a caffeine reduction apparatus capable of effectively eluting and decomposing caffeine within a short time, caffeine being included in coffee grounds that are discarded after brewing coffee, and then capable of drying the coffee grounds.

In addition, another objective of the present disclosure is to provide a method of utilizing coffee grounds such as clay for an educational purpose by mixing an additive to a coffee grounds powder that is dried by using a caffeine reduction apparatus.

In order to achieve the objective of the present disclosure, there is provided a caffeine reduction apparatus including: a main housing provided with an inlet and outlet pipe such that water flows inside the main housing; a mixing portion including an accommodating portion through which coffee grounds are input inside the accommodating portion, and including a blade configured to be rotated inside the accommodating portion such that the coffee grounds are mixed; a driving portion configured to rotate the blade; and an ultraviolet ray emitting portion configured to emit ultraviolet rays toward the mixing portion.

In the present disclosure, when water at a predetermined level is filled to the main housing, the ultraviolet ray emitting portion may be configured to emit the ultraviolet rays to an elution water in which the coffee grounds accommodated in the mixing portion are submerged and caffeine is eluted.

In the present disclosure, the blade may be connected to a rotary shaft that is rotated by rotating force of the driving portion, and may include: a rod that protrudes outward from a center of the rotary shaft; a wing coupled to an end portion of the rod; and an inclined piece which is coupled to a first surface of the wing and which protrudes to be inclined at a predetermined angle with respect to the wing.

In another embodiment of the present disclosure, a caffeine reduction apparatus may include: a main housing provided with an inlet and outlet pipe such that water flows inside the main housing; a mixing portion comprising an accommodating portion through which coffee grounds are input inside the accommodating portion, and comprising a blade configured to be rotated inside the accommodating portion such that the coffee grounds are mixed; a driving portion configured to rotate the blade; and an ultraviolet ray emitting portion positioned at an upper portion of the main housing and mounted at an inner side surface of a door that seals an inner portion of the mixing portion, the ultraviolet ray emitting portion being configured to emit ultraviolet rays toward the mixing portion, wherein when water at a predetermined level is filled to the main housing, the ultraviolet ray emitting portion is configured to emit the ultraviolet rays to an elution water in which the coffee grounds accommodated in the mixing portion are submerged and caffeine is eluted, wherein the caffeine reduction apparatus may further includes: an additive input portion for inputting at least one of hydrogen peroxide, hydrochloric acid, sodium hydroxide, xanthan gum, and flour to an inside of the main housing; a heating portion configured to heat the water or the mixing portion; a blower configured to inhale air inside the mixing portion and to discharge the air to an outside; a heat exchanger configured to cool the air inhaled through the blower; a water level controlling portion configured to check a water level inside the mixing portion; a temperature sensing portion configured to sense a temperature; a pH sensing portion configured to sense a pH; and a control portion configured to operate the water level controlling portion such that the water is introduced inside the mixing portion, configured to operate the heating portion by sensing the temperature inside the mixing portion, and connected to the pH sensing portion such that a pH inside the mixing portion is maintained to a predetermined pH, thereby controlling an input amount of an additive input from the additive input portion, and wherein when the coffee grounds inside the mixing portion are dried by discharging the elution water, the control portion is configured to control the additive input portion such that at least one of the xanthan gum and the flour is input to the mixing portion.

In the present disclosure, the coffee grounds that are input may be mixed by a second surface of the wing when the rotary shaft is rotated in a forward direction, the second surface being not coupled to the inclined piece, and when the rotary shaft is rotated in a reverse direction, the coffee grounds may be gathered to a center of the accommodating portion by an inclined angle of the inclined piece, and then the coffee grounds may be discharged through a discharge port that is formed at the accommodating portion.

In the present disclosure, the caffeine reduction apparatus may further include: a heating portion configured to heat the water or the mixing portion; a blower configured to inhale air inside the mixing portion and to discharge the air to an outside; and a heat exchanger configured to cool the air inhaled through the blower.

In the present disclosure, the caffeine reduction apparatus may further include an additive input portion for inputting at least one of hydrogen peroxide, hydrochloric acid, and sodium hydroxide to an inside of the main housing.

The present disclosure may include a method of manufacturing a coffee grounds powder, the method including: an inputting process in which coffee grounds are input into a mixing portion of any one of caffeine reduction apparatuses as described above; a water inputting process in which an inlet and outlet pipe is opened and water is filled inside the main housing such that the coffee grounds input into the mixing portion are submerged; an ultraviolet ray emitting process in which ultraviolet rays are emitted to the water and an inside of the mixing portion; an elution water discharging process in which an elution water in which caffeine is decomposed is discharged to an outside from the main housing; a drying process in which the coffee grounds that remain in the mixing portion are dried by rotating the mixing portion; and a mixing process in which the coffee grounds in which drying is finished are mixed with a viscous additive.

In the present disclosure, the ultraviolet ray emitting process may further include: a pH controlling process in which a pH of the elution water is controlled; and a hydrogen peroxide inputting process in which hydrogen peroxide is input into the elution water.

In the present disclosure, caffeine remaining in the coffee grounds that are discarded after brewing coffee is capable of being eluted and decomposed in a short time, and also a drying process is simultaneously performed, so that a rapid treatment may be realized.

In addition, in the present disclosure, since caffeine in the coffee grounds that are recycled is removed, there is an advantage that the coffee grounds can be recycled in a wide range such as a clay for children to use, a deodorant, a fertilize for soil, and so on.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, an embodiment of a caffeine reduction apparatus of the present disclosure will be described in detail with reference to the accompanying drawings.

Figure 1:
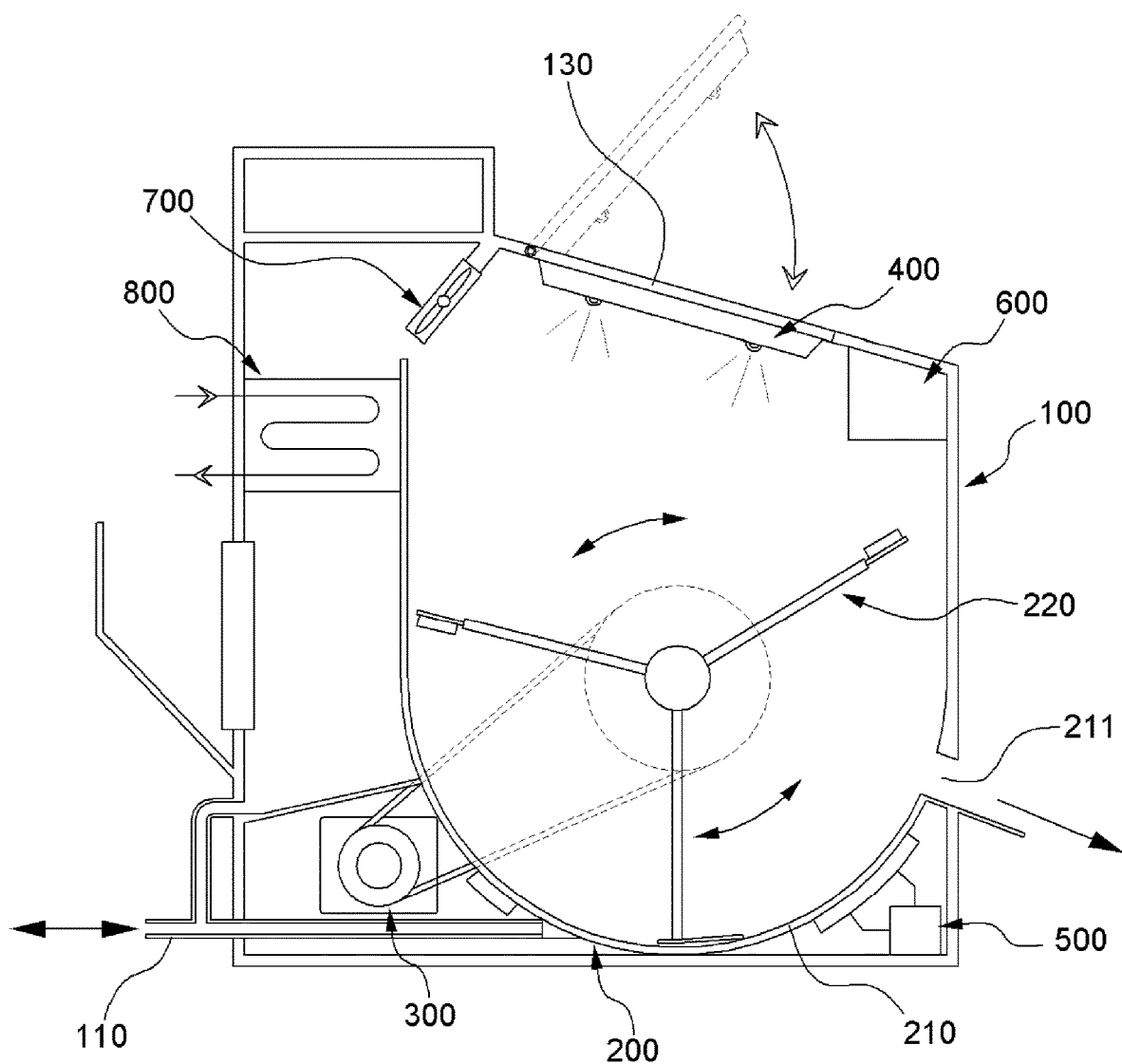
FIG. 1 is a schematic view illustrating a main configuration of the present disclosure.
Figure 2:
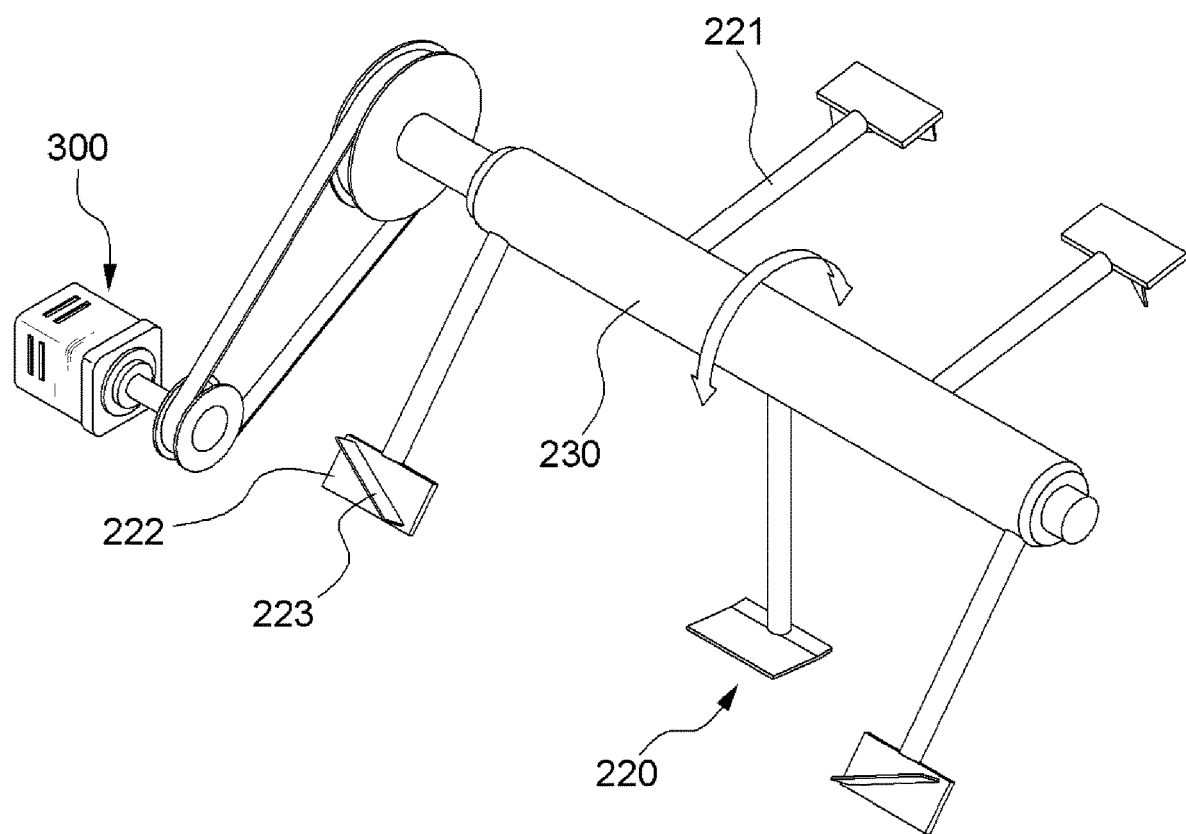
FIG. 2 is a perspective view illustrating a blade and a driving portion of the present disclosure.

Referring to FIGS. 1 and 2, the present disclosure includes a main housing 100, a mixing portion 200, a driving portion 300, and an ultraviolet ray emitting portion 400.

The main housing 100 may be formed in a hollow cylindrical shape. The shape of the main housing 100 is not limited thereto. A door 130 for inputting coffee grounds and so on is provided at a top surface of the main housing 100. An inlet and outlet pipe 110 through which water flows such that water is filled at a predetermined level to the hollow inside of the main housing 100 is provided at a first side of the main housing 100. A valve (not illustrated) for opening and closing the inlet and outlet pipe 110 may be provided. Meanwhile, a pump (not illustrated) for supplying or discharging water to the mixing portion 200 may be further provided at the inlet and outlet pipe 110. As necessary, water can be filled to or discharged from inside the main housing 100. Otherwise, the inlet and outlet pipe 110 may be divided into an inlet pipe and an outlet pipe. Although not illustrated, the inlet pipe may be connected to a faucet or the like, and the outlet pipe may be connected to a sewer or the like.

The driving portion 300 may be provided inside the main housing 100. The driving portion 300 may rotate a blade 220 that will be described later.

As illustrated in FIG. 1, the blade 220 provided inside the mixing portion 200 is mounted such that the blade 220 is rotated inside the mixing portion 200 by the driving portion 300. An accommodating portion 210 of the mixing portion 200 is formed in a hollow cylindrical shape. Coffee grounds are input inside the accommodating portion 210 by opening the door 130. When water is supplied to the accommodating portion 210, the coffee grounds accommodated in the accommodating portion 210 may be submerged in the supplied water.

The driving portion 300 may be provided at a first side of the accommodating portion 210. The driving portion 300 is connected to a rotary shaft 230 and the blade 220, and is configured to rotate the rotary shaft 230 and the blade 220. The driving portion 300 may be an AC motor or a DC motor, or may be a step motor or a servo motor capable of rotating in both directions. By rotating the mixing portion 200, the coffee grounds inside the mixing portion 200 may be mixed well with water, and may be evenly exposed to ultraviolet rays.

As illustrated in FIG. 1, the ultraviolet ray emitting portion 400 is mounted inside the main housing 200. As illustrated in the drawing, the ultraviolet ray emitting portion 400 may be mounted at an inner side surface of the door 130. When water at the predetermined level is filled to the accommodating portion 210, the accommodated coffee grounds are submerged in the water and caffeine is eluted. At this time, the ultraviolet rays emitted from the ultraviolet ray emitting portion 400 is directed to an elution water in which caffeine is eluted. Caffeine included in the elution water is decomposed by the ultraviolet rays.

Referring to FIGS. 1 and 2, the mixing portion 200 includes the accommodating portion 210 and the blade 220. The accommodating portion 210 is formed in a shape that is similar to a shape that is formed by dividing a cylinder having a predetermined diameter in half, and the coffee grounds are input inside the accommodating portion 210. A discharge port 211 through which the coffee grounds that are dried are discharged is formed at a second side of the accommodating portion 210.

The door 130 is mounted at an upper portion of the main housing 110. The door 130 may be finished with a material such as rubber, silicone, or the like, so that an inner portion of the mixing portion 200 is sealed when the door 130 is closed.

Referring to FIGS. 1 and 2, the rotary shaft 230 is connected to the driving portion 300. As an embodiment, a first end of the rotary shaft 230 is exposed to an outside of the accommodating portion 210, and the first end of the rotary shaft 230 that is exposed is connected to the driving portion 300 and receives rotating force. As a method of connecting the rotary shaft 230 to the driving portion 300, an already known technology such as a sprocket and chain connecting method, a pulley and belt connecting method, or the like may be used.

Referring to FIG. 1, the ultraviolet ray emitting portion 400 may be mounted at the inner side surface of the door 130. Although not illustrated, the ultraviolet ray emitting portion 400 may be mounted at the rotary shaft 230 or the blade 220.

Referring to FIG. 1, a heating portion 500 for heating water introduced inside the mixing portion 200 may be provided. The heating portion 500 may be provided at an inner wall or an outer wall of the accommodating portion 210. By operating the heating portion 500, water inside the accommodating portion 210 may be heated, or the coffee grounds that remain after water is discharged may be dried.

From the coffee grounds that are submerged in the water, caffeine is eluted after a predetermined time elapses. In order to decompose caffeine that is eluted, hydrogen peroxide ($H_2O_2$) may be supplied while the ultraviolet rays are emitted. In order to control pH (hydrogen ion concentration index) of a solution inside the accommodating portion 210, a pH controlling agent (for example, hydrochloric acid, sodium hydroxide, and so on) may be input. For this purpose, an additive input portion 600 is provided. In one embodiment, a pH sensing portion SP configured to sense a pH is also provided (see FIG. 3). A control portion CT (see FIG. 3) is connected to the pH sensing portion SP such that the pH inside the mixing portion 200 is maintained to a predetermined pH, thereby controlling an input amount of an additive input from the additive input portion 600.

Although not illustrated, the additive input portion 600 may be divided into a hydrogen peroxide ($H_2O_2$) input portion and a pH controlling agent input portion. Although not specifically illustrated, hydrogen peroxide ($H_2O_2$) and the pH controlling agent may be supplied to the accommodating portion 210 through a single pipe. Otherwise, hydrogen peroxide ($H_2O_2$) and the pH controlling agent may be supplied to the accommodating portion 210 through separate lines.

Referring to FIG. 1, the caffeine reduction apparatus further includes a blower 700 configured to inhale air inside the mixing portion 200 and to discharge the air to an outside; and a heat exchanger 800 configured to cool the air inhaled through the blower 700.

Referring to FIG. 2, the blade 220 will be described. The blade 220 includes a rod 221 radially formed on the rotary shaft 230, a wing 222 coupled to an end portion of the rod 221, and an inclined piece 223 provided at a first surface of the wing 222.

When the rotary shaft 230 is rotated in a forward direction (clockwise direction in FIG. 1), the coffee grounds that are input are mixed by a second surface of the wing 222 to which the inclined piece 220 is not coupled. When the rotary shaft 230 is rotated in a reverse direction (counterclockwise direction in FIG. 1), the coffee grounds are gathered toward a center of accommodating portion 210 by an inclined angle of the inclined piece 223, and some of the coffee grounds may be discharged through the discharge port 211 that is formed at the accommodating portion 210. That is, by the counterclockwise rotation, as the coffee grounds are slid in an inclined direction of the inclined piece 223 that is formed on the first surface of the wing 222, the coffee grounds are gathered toward the center of the accommodating portion 210, i.e., the discharge port 211, and are discharged.

An elution and decomposition process of caffeine in coffee grounds performed by the caffeine reduction apparatus according to the present disclosure will be described.

Coffee grounds are input into the mixing portion 200 of the caffeine reduction apparatus (S100).

In order to submerge the coffee grounds after the coffee grounds are input, the inlet and outlet pipe 110 is opened and water is filled inside the accommodating portion 210 (S200). It is preferable that 1 L to 5 L of water is input when 1,000 g of coffee grounds are input. After the coffee grounds are input are mixed with water and then after about 20 minutes to 1 hour has elapsed, caffeine is eluted. It is preferable that the temperature of the filled water may be heated to about 60 to 90 degrees Celsius. By increasing the temperature through the operation of the heating portion 500, an effect that caffeine is continuously eluted as time elapses can be seen.

As described above, after a predetermined time has elapsed, ultraviolet rays are guided to be emitted to water in which caffeine is eluted. An ultraviolet ray emitting process (S300) in which the ultraviolet rays are emitted to water inside the mixing portion 200 is performed. As the ultraviolet rays, it is preferable that UV-B rays or UV-C rays rather than UV-A rays are used. Specifically, emitting the UV-C rays is preferable.

While the ultraviolet rays (specifically, the UV-C rays) are emitted, 30 mM to 60 mM of hydrogen peroxide is input. Divalent iron may be additionally input during the process of emitting the ultraviolet rays and inputting hydrogen peroxide. When divalent iron is additionally input (about 0.3 mM to 0.8 mM of divalent iron), Fenton reaction is activated, so that a generation efficiency of hydroxyl radicals may be increased. Iron ions act as catalysts, and hydrogen peroxide is decomposed, so that hydroxyl radicals are generated. Trivalent iron oxidized from divalent iron as the generated hydroxyl radicals decompose organic contaminants repeats the process of being reduced again and then decomposes contaminants. It is known than iron ions are highly activated in pH 3 to 4 conditions.

In the condition as described above in which the UV-C rays are emitted and 30 mM to 60 mM of hydrogen peroxide and 0.3 mM to 0.8 mM of divalent iron are input, when about 40 minutes to 2 hours have elapsed, most of caffeine that is eluted is decomposed.

Next, an elution water discharge process (S400) in which the elution water in which caffeine is eluted is discharged from the accommodating portion 210 to the outside is performed. When the elution water is discharged, a drying process (S500) in which the coffee grounds that remain in the mixing portion 200 are dried while the mixing portion 200 is rotated is performed. Next, a mixing process (S600) in which a viscous additive (for example, xanthan gum, flour, or the like) is mixed with the dried coffee grounds is performed, and the elution and decomposition process is completed.

Figure 3:
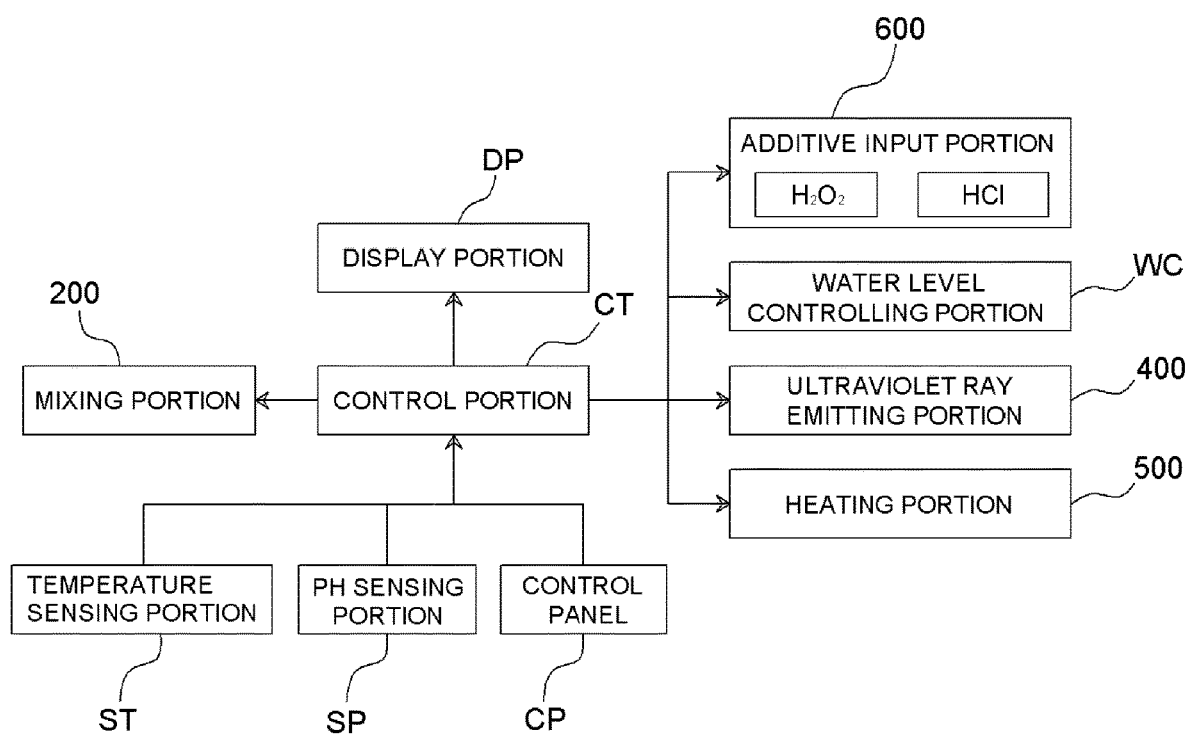
FIG. 3 is a view illustrating a connection relation of a control portion the present disclosure.

Referring to FIG. 3, a method of controlling the caffeine reduction apparatus according to the present disclosure will be described. After coffee grounds are input inside the mixing portion 200, water is introduced from outside by controlling a control panel CP. A control portion CT introduces water inside the mixing portion 200 by operating a water level controlling portion WC. A water level sensor (not illustrated) that is capable of checking a water level inside the main housing 100 when water is introduced into the main housing 100 by using the pump or the faucet may be included. When the water level becomes an appropriate water level, the operation of the pump may be stopped or the faucet may be closed. Otherwise, the valve (not illustrated) may be closed.

Next, the control portion CT rotates the mixing portion 200. The coffee grounds are stirred such that the coffee grounds are mixed well with water. When the coffee grounds are stirred, the control portion CT may operate the heating portion 500 while sensing the temperature by a temperature sensing portion ST that is separately provided. The control portion CT maintains the temperature such that the appropriate temperature as described above is maintained.

When caffeine is eluted after the predetermined time elapses, the mixing portion 200 is continuously rotated, and the control portion CT controls the ultraviolet ray emitting portion 400 and the additive input portion 600 ($H_2O_2$, HCl, divalent iron, or the like). While the ultraviolet rays (UV-C rays) are emitted, HCl, divalent iron, and so on are input so that $H_2O_2$ and pH 3 is maintained.

After the predetermined time that is described above has elapsed, the control portion CT stops the operations of the additive input portion 600, the ultraviolet ray emitting portion 400, the heating portion 500, and so on, and controls the water level control portion WC. That is, water inside the mixing portion 200 is discharged.

When discharging of water is completed, the heating portion 500 is operated, and the mixing portion 200 is controlled to be rotated. Through this, drying of the coffee grounds in the mixing portion 200 is completed. when the drying of the coffee grounds is completed after the predetermined time elapses, the viscous additive as described above is input, and the process is finished.

What is claimed is:

1. A caffeine reduction apparatus comprising:
   a main housing provided with an inlet and outlet pipe such that water flows inside the main housing;
   a mixing portion comprising an accommodating portion through which coffee grounds are input inside the accommodating portion, and comprising a blade configured to be rotated inside the accommodating portion such that the coffee grounds are mixed;
   a driving portion configured to rotate the blade;
   an ultraviolet ray emitting portion positioned at an upper portion of the main housing and mounted at an inner side surface of a door that seals an inner portion of the mixing portion, the ultraviolet ray emitting portion being configured to emit ultraviolet rays toward the mixing portion;
   an additive input portion for inputting at least one of hydrogen peroxide, hydrochloric acid, sodium hydroxide, xanthan gum, and flour to an inside of the main housing;
   a heating portion configured to heat the water or the mixing portion;
   a blower configured to inhale air inside the mixing portion and to discharge the air to an outside;
   a heat exchanger configured to cool the air inhaled through the blower;
   a water level controlling portion configured to check a water level inside the mixing portion;
   a temperature sensing portion configured to sense a temperature;
   a pH sensing portion configured to sense a pH; and
   a control portion configured to:
     operate the water level controlling portion such that the water is supplied inside the mixing portion at a predetermined level that the coffee grounds accommodated in the accommodating portion are submerged in the water,
     operate the heating portion while the temperature sensing portion senses the temperature inside the mixing portion such that the water in which the coffee grounds are submerged is heated and caffeine is eluted from the coffee grounds,
     operate the ultraviolet ray emitting portion to emit the ultraviolet rays to the water in which the caffeine is eluted from the coffee grounds such that the caffeine included in the water is decomposed by the ultraviolet rays,
     operate the additive input portion to control an amount of an additive, including at least one of the hydrogen peroxide, the hydrochloric acid, and the sodium hydroxide, input into the water in which the caffeine is decomposed by the ultraviolet rays while the pH sensing portion connected to the control portion senses the pH inside the mixing portion such that the pH inside the mixing portion is maintained to a predetermined level,
     operate the water level controlling portion to discharge the water in which the additive is added and the heating portion to heat the mixing portion such that the coffee grounds remained in the mixing portion are dried, and
     control the additive input portion to input at least one of the xanthan gum and the flour to coffee grounds remained and dried in the mixing portion.

2. The caffeine reduction apparatus of claim 1, wherein the blade is connected to a rotary shaft that is rotated by rotating force of the driving portion, and comprises:
   a rod that protrudes outward from a center of the rotary shaft;
   a wing coupled to an end portion of the rod; and
   an inclined piece which is coupled to a first surface of the wing and which protrudes to be inclined at a predetermined angle with respect to the wing.

3. The caffeine reduction apparatus of claim 2, wherein the rotary shaft is configured to rotate in a forward direction such that a second surface of the wing mixes the coffee grounds that are input in the mixing portion, wherein the second surface is not coupled to the inclined piece, and
   wherein the rotary shaft is configured to rotate in a reverse direction such that the inclined angle of the inclined piece gathers the coffee grounds to a center of the accommodating portion discharges the coffee grounds through a discharge port that is formed at the accommodating portion.

\* \* \* \* \*